United States Patent [19]

Lunsford

[11] Patent Number: 5,065,313
[45] Date of Patent: Nov. 12, 1991

[54] DIGITAL COMPUTER SYSTEM HAVING CIRCUIT FOR REGULATION OF I/O COMMAND RECOVERY TIME

[75] Inventor: David R. Lunsford, Austin, Tex.

[73] Assignee: Dell USA Corporation, Austin, Tex.

[21] Appl. No.: 653,862

[22] Filed: Feb. 8, 1991

Related U.S. Application Data

[63] Continuation of Ser. No. 330,671, Mar. 30, 1989, abandoned.

[51] Int. Cl.[5] ............................................. G06F 13/14
[52] U.S. Cl. ................................. 395/275; 364/238.3; 364/271.5; 364/DIG. 1
[58] Field of Search ... 364/200 MS File, 900 MS File; 340/825.5; 307/440, 590

[56] References Cited

U.S. PATENT DOCUMENTS

| | | | |
|---|---|---|---|
| 4,224,667 | 9/1980 | Lewis et al. | 364/200 |
| 4,268,904 | 5/1981 | Suzuki et al. | 364/200 |
| 4,393,446 | 7/1983 | Gurr et al. | 364/200 |
| 4,400,773 | 8/1983 | Brown et al. | 364/200 |
| 4,638,452 | 1/1987 | Schultz et al. | 364/900 |
| 4,675,807 | 6/1987 | Gourneau et al. | 364/200 |
| 4,772,888 | 9/1988 | Kimura | 340/825.5 |

Primary Examiner—Michael R. Fleming
Assistant Examiner—Gopal C. Ray
Attorney, Agent, or Firm—Thomas G. Devine

[57] ABSTRACT

A digital computer system has an I/O command recovery circuit for providing suitable I/O recovery time for any one of a plurality of associated peripheral devices. The circuit, transparent to both software and system execution speed, enables the digital computer system to efficiently run certain software application programs that interface with the peripheral devices and provide timing loops for setting the command recovery time. Those certain software application programs, designed for earlier and slower computer systems, run the timing loops in too short a time to provide the maximum I/O recovery time. The addition of the I/O command recovery circuit provides selectable and suitable recovery times for each of the associated peripheral devices, including no recovery time for those devices not requiring it.

7 Claims, 3 Drawing Sheets

DIGITAL COMPUTER SYSTEM HAVING CIRCUIT FOR REGULATION OF I/O COMMAND RECOVERY TIME

This application is a continuation of application Ser. No. 07/330,671, filed Mar. 30, 1989 abandoned.

BACKGROUND OF THE INVENTION

1. Field of the Invention

This invention relates to digital computers with associated peripheral devices. More specifically, it relates to a circuit for the regulation of the I/O command recovery time for the peripheral devices.

2. Description of the Prior Art

Many input/output (I/O) peripheral devices impose a specific timing constraint on a digital computer system. The timing constraint is known as "I/O Command Recovery Time". This constraint specifies a minimum time between successive I/O command operations. In the prior art, "timing loops" have been implemented in software to provide this I/O command recovery time. These timing loops provided an adequate delay time if the processing speed of the computer system is in the order of 6 to 8 Mhz. With the advent of 20 Mhz and higher speed systems, these timing loops execute significantly faster resulting in an I/O command recovery time that is too short for many of the peripheral devices.

In the faster machines, the prior art method of handling the problem is to provide a "compatibility speed" that forces a high speed computer to run at a slower speed to emulate a 6 Mhz to 8 Mhz computer. This causes the computer to run slower and the potential performance is not fully utilized. This under-utilization compounds itself when running the application in a multitasking environment along with other applications. The compatibility speed will force all applications to run at the slower speed.

This invention provides an independent and operator transparent system for guaranteeing the I/O command recovery time requirement while allowing maximum execution performance of the system.

BRIEF SUMMARY OF THE INVENTION

The invention provides a digital computer with a suitable I/O command recovery time for its peripheral devices. Certain application programs currently in use, specifically in personal computers, utilize timing loops to provide the I/O command recovery time.

The inventive I/O command recovery circuit, in combination with the bus controller of the computer system and the prior art timing loop technique, provides increased performance speed while maintaining compatibility with the prior art application software for use in slower computers. The I/O commands from the computer, together with their addresses, are sent to a decoder. The decoder, through the addresses, determines which peripheral device is to be accessed. Some peripheral devices, such as the "hard disk" in a personal computer, do not require any I/O command recovery time. In those cases, the decoder will not present an output signal.

A counter is provided (a down-counter in this preferred embodiment) that is set to a number corresponding to the particular peripheral device selected and identified by the decoder. The output of the decoder is, therefore, used to set the number in the counter. The counting speed of the counter is controlled by a convenient timing source, such as the main clock in the computer system. A signal from the decoder starts the count-down providing a recovery request signal at its output. The recovery request signal is applied to the bus controller of the computer system which reacts to the recovery request signal as to an ordinary hold request. The bus controller then can assess the current priority of the recovery request signal and issue a hold request to the CPU for the duration of the I/O recovery time.

In this preferred embodiment, a Dell Computer Corporation, Model 310 computer system is employed. This particular system utilizes a Cache memory and this Cache memory is used in the execution of the timing loops. The bus controller does not stop this operation and, therefore, the timing loop operation is concurrent with the operation of the I/O command recovery time circuit.

In another embodiment, a computer system without a Cache memory is interrupted by the bus controller when it attempts to execute the timing loops and must wait until the I/O command recovery time circuit has completed its time-out. At that time, the timing loops are executed but ordinarily are a very small percentage of the total time which is the sum of the timing loop time and the time-out.

The principle object of this invention is to provide a computer having an I/O command recovery circuit providing appropriate I/O recovery for I/O peripheral devices irrespective of computer speed.

This and other objects will be made evident in the detailed description that follows.

DETAILED DESCRIPTION OF THE INVENTION

This invention provides a circuit for increasing performance while maintaining backward compatibility with slower personal computers. Even with execution speeds faster than in the past, the invention provides adequate I/O command recovery time for the individual peripheral devices. Some of the peripheral devices, such as the hard disk of the personal computer requires no I/O command recovery time and, therefore, none is assigned to that device.

Figure 1:
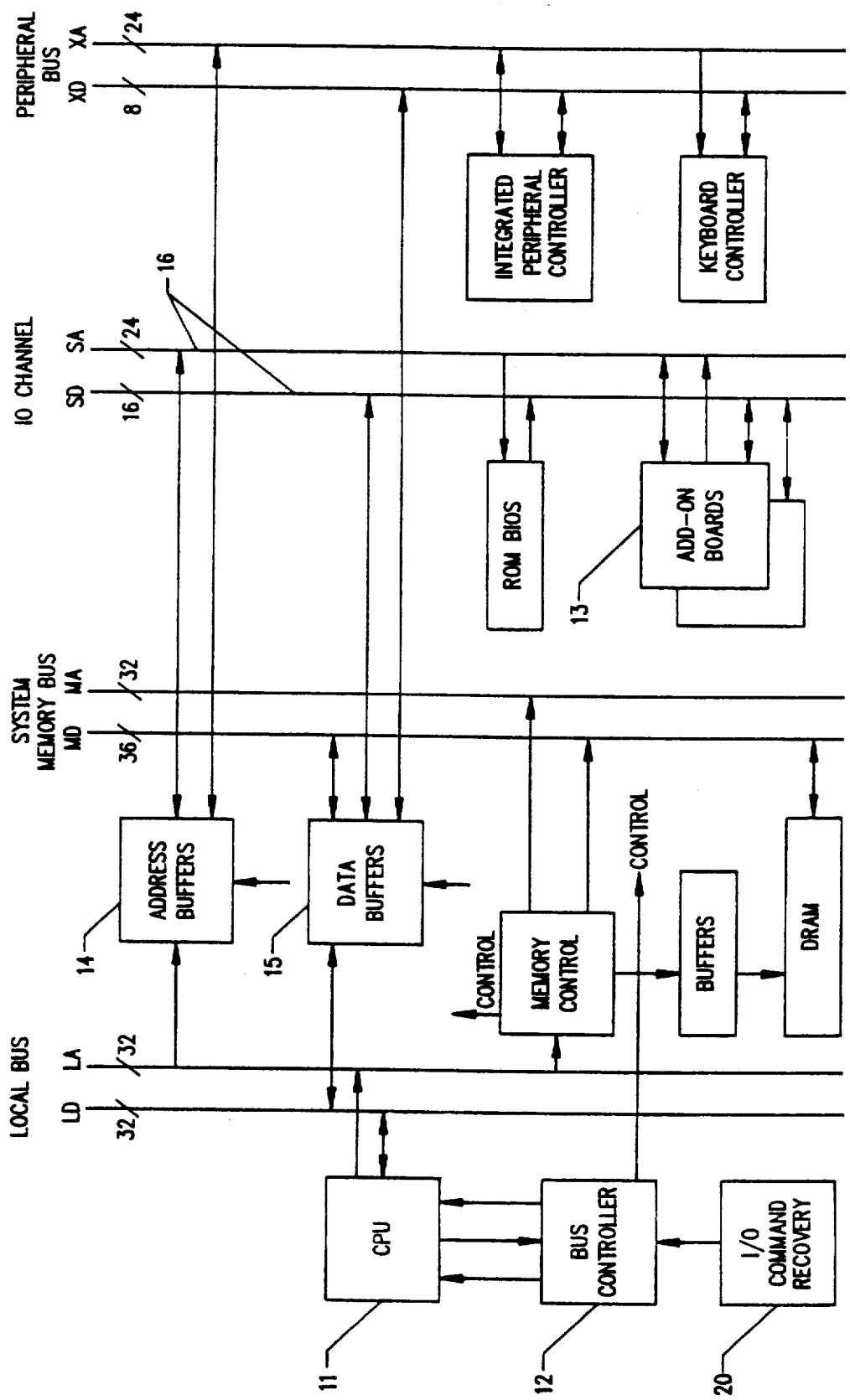
FIG. 1 is a block diagram of the computer system of this invention.

FIG. 1 illustrates I/O Command Recovery Circuit 20 input to bus controller 12 which, in turn, is bilaterally connected to CPU 11. In the preferred embodiment, bus controller 12 is a type 82C301 Bus Controller manufactured by Chips & Technologies, Inc. CPU 11, in this preferred embodiment, is Type 80386 Processor manufactured by Intel Corporation.

Address buffers 14 and data buffers 15 are shown for providing address and data, respectively, through I/O channel 16. Add-on-boards 13 are the receptacles for receiving and interconnecting the peripheral devices. Bus controller 12 controls bus arbitration on I/O channel 16. The detailed description of bus controller 12 may be found in Chips & Technologies, Inc. publication "Chips-82C301, 82C302, 82A303, 82A304, 82A305, 82A306, CS8230: AT/386 CHIP Set, original copyright 1985.

The application program used in this preferred embodiment has a timing loop that uses a jump (JMP) instruction shown below in assembly language macro instruction:

```
Macro "IORCVRY"
         JMP S+2        # of jumps is
         JMP S+2        proportional to time
         JMP S+2        delayed
         JMP S+2
         JMP S+2
End Macro
```

The "JMP S+2" instruction flushes a pre-fetch queue, is not dependent on the instruction stream within which it resides, thus using up a specific amount of time. Of course, the timing loop could be eliminated from the software, but that would involve extensive and expensive changes.

Figure 2:
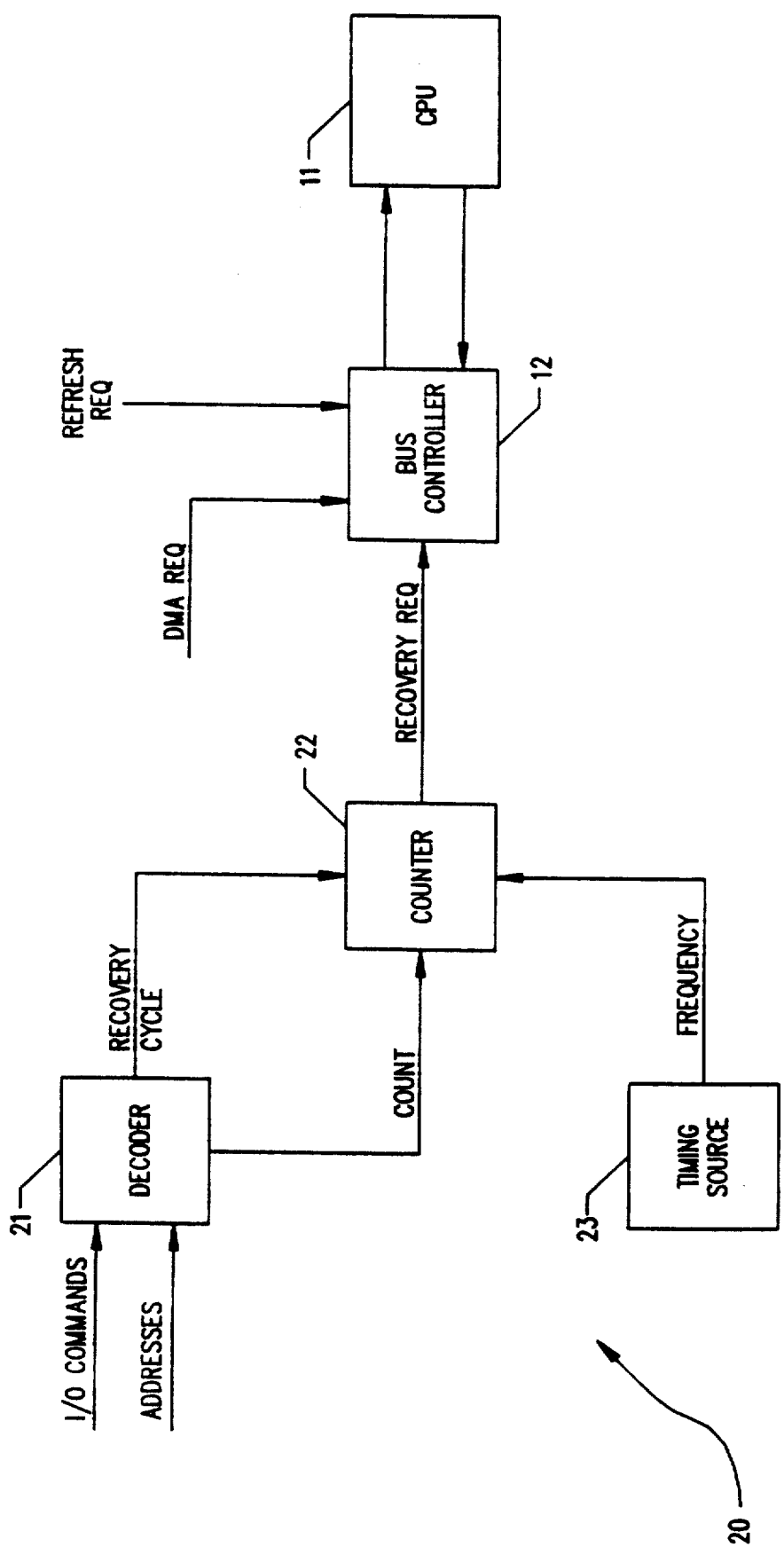
FIG. 2 is a block diagram showing the I/O Command Recovery Circuit.

FIG. 2 illustrates decoder 21 for receiving the I/O commands and addresses, providing a recovery cycle signal required for selected peripheral devices determined by its address. If the specified peripheral device requires no recovery cycle, then no signal will be provided from decoder 21.

The appropriate count, as determined by the selected peripheral device is sent from decoder 21 to counter 22. The recovery cycle signal is also sent from decoder 21 to load counter 22 with the count. Timing source 23, which may be any appropriate timing source but conveniently is the main clock of the computer of this computer system 10, provides a frequency input to counter 22. The output of counter 22 is the recovery request which is sent to bus controller 12. Bus controller 12 handles the recovery request as a hold request and assesses the priority of that request. When ready, the bus controller 12 sends a hold to CPU 11 which is kept high for the duration of the I/O recovery time. In that manner, no additional I/O request can be handled until the recovery time has ended. In this preferred embodiment, CPU 11 has a Cache memory which is used in the performance of the prior art timing loop technique. The timing loop technique, under software control, is then done concurrently with the operation of I/O Command Recovery Circuit 20. In an another embodiment, CPU 11 does not have a Cache memory and must wait until circuit 20 has completed its operation before the timing loop technique is started. Normally, the timing loop is a very small percentage of the I/O recovery time in a state of the art personal computer.

Figure 3:
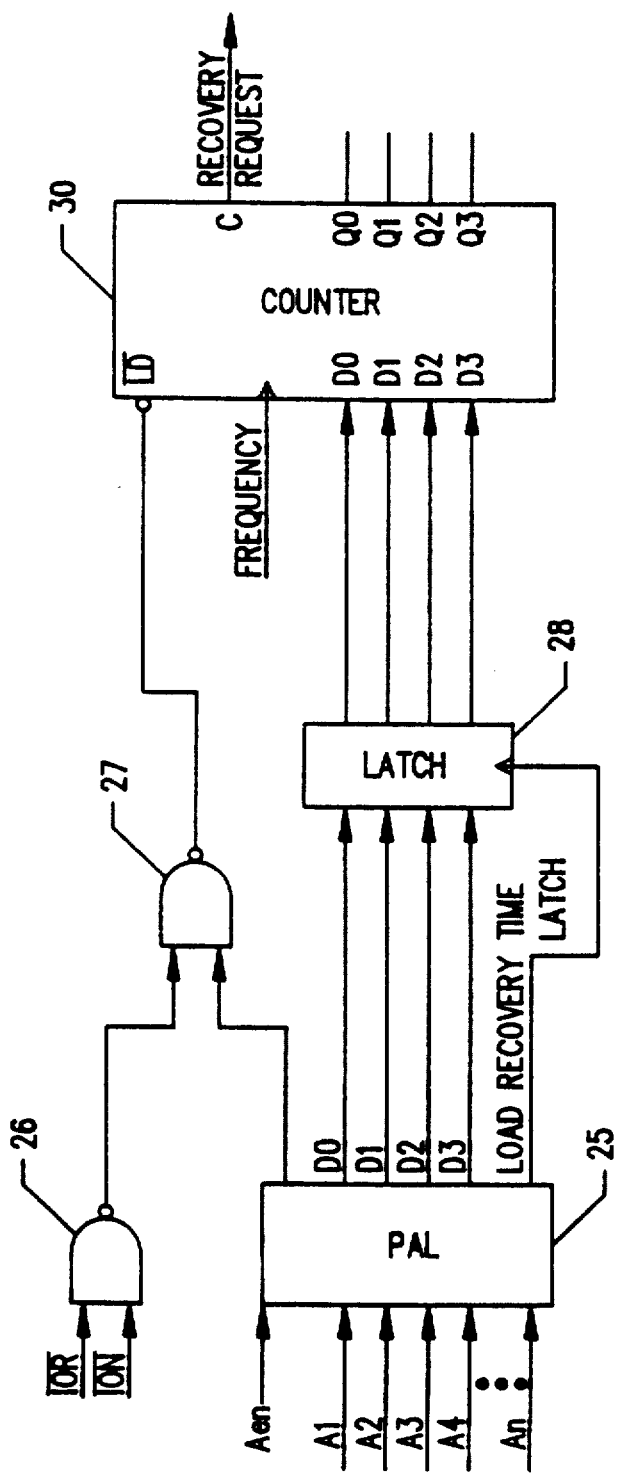
FIG. 3 is a partial schematic of the I/O Command Recovery Circuit.

FIG. 3 illustrates NAND gate 26 receiving I/O read and write instructions, its output providing one input to NAND gate 27. The other input to NAND gate 27 is supplied by Programmable Array of Logic (PAL) 25. In this preferred embodiment, address lines A1-An provide inputs to PAL 25. Address enable signal (Aen) provides the gating. The address lines identify the peripheral device. PAL 25 is programmed to provide the appropriate count out on lines D0-D3 which, in turn, will provide the appropriate I/O command recovery time for the selected peripheral device. Outputs D0-D3 are loaded into latch 28 by the load recovery time latch signal from PAL 25. The output of latch 28 then sets the count in counter 30. In this preferred embodiment, counter 30 is a down-counter, Type 74LS161. The recovery request signal is provided when the counter counts down the number impressed on inputs D0-D3. At that time, the recovery request signal is dropped and I/O Channel 16 is again available.

In an alternative embodiment, PAL 25 need not be employed to set the count. The count may be set by simply selecting a count on inputs D0-D3 of counter 30, all "1"s, for example. In this manner, an adequate time-out may be selected, but will be the same for each peripheral device used—except for those not requiring any recovery time. They are identified by the output of NAND gate 27 which will then not start counter 30.

Those skilled in the art may change the individual components shown in this invention, including the CPU, the bus controller, the various components making up the computer system, and the I/O command recovery circuit, all without departing from the spirit and scope of this invention which is limited only by the appended claims.

What is claimed is:

1. A digital computer system, having a central processor unit (CPU), a plurality of addressable input/output (I/O) peripheral devices connected thereto for accessing by the digital computer system through I/O commands, at least one of the plurality of I/O peripheral devices requiring a corresponding access recovery time, comprising:
   (a) decoding means for receiving the I/O commands and the addresses of the associated I/O peripheral devices from the CPU and having an output;
   (b) time duration circuitry for providing a recovery request signal for those peripheral devices requiring access recovery times of a time duration determined by the combination of I/O commands and the addresses of the associated I/O peripheral devices from the output of the decoding means, and for providing no recovery request signal for those devices not requiring access recovery time; and
   (c) a bus controller connected to the CPU for receiving the recovery request signal from the time duration circuitry and generating a hold signal in response to the recovery request signal for transmission to the CPU to prevent entry into the decoding means of any subsequent I/O commands in the presence of the hold signal, the duration of which is determined by the length of the recovery request signal from the time duration circuitry, and to allow entry of I/O commands into the decoding means in the absence of the hold signal.

2. The system of claim 1 wherein the decoding means comprises a cycle decoder for receiving the I/O commands and the addresses identifying the associated I/O devices, and for providing the recovery request signal to the bus controller.

3. The system of claim 2 wherein the time duration circuitry further comprises:
   (a)
       (i) a source of timing pulses; and
       (ii) a counting circuit timed by the source of timing pulses and activated by the output of the cycle decoder, set to count a selected number determined by the addresses of the I/O devices, the output of the counting circuit providing the recovery request signal.

4. The system of claim 3 wherein the cycle decoder comprises a programmable array of logic (PAL) for receiving and decoding the selected addresses.

5. The system of claim 4 wherein the counting circuit is set by a number output from the PAL, resulting from decoding a selected address to provide a recovery request signal of a suitable duration for the selected I/O device.

6. The system of claim 5 wherein the counting circuit comprises a latch for receiving the number output from the PAL, and a down-counter, connected to receive the number from the latch, and to count down to zero thereby providing the recovery request signal of a suitable duration for the selected I/O peripheral device.

7. The system of claim 3 wherein the counting circuit comprises a down-counter to receive the selected number, and to count down to zero from the selected number.

* * * * *